United States Patent [19]
Lueders

[11] 3,985,221
[45] Oct. 12, 1976

[54] TUBE FEEDER WITH SELF-ADJUSTING LOADER

[75] Inventor: Willi H. Lueders, Sandusky, Ohio

[73] Assignee: General Motors Corporation, Detroit, Mich.

[22] Filed: Oct. 28, 1975

[21] Appl. No.: 625,905

[52] U.S. Cl. .............................. 198/474; 51/215 H; 82/2.7; 82/102; 214/1 PB; 198/862
[51] Int. Cl.² ........................................ B65G 47/06
[58] Field of Search ...................... 198/26, 97, 101; 51/215 R, 215 H; 82/2.7, 102; 214/1 PB, 1.3; 193/31 R, 31 A

[56] References Cited
UNITED STATES PATENTS

| | | | |
|---|---|---|---|
| 2,771,662 | 11/1958 | Ziska | 82/7.7 |
| 2,838,158 | 6/1958 | Kerr et al. | 198/26 |
| 2,880,844 | 4/1959 | Vogeli | 198/26 |
| 3,200,679 | 8/1965 | Johnson | 51/215 R |
| 3,306,472 | 2/1967 | Blanz | 214/1 P |
| 3,571,981 | 3/1971 | Schaller | 51/215 R |
| 3,655,067 | 4/1972 | White | 214/1 PB |
| 3,757,927 | 9/1973 | Gable et al. | 82/2.7 |

FOREIGN PATENTS OR APPLICATIONS

| | | | |
|---|---|---|---|
| 855,250 | 11/1960 | United Kingdom | 51/215 R |

Primary Examiner—Evon C. Blunk
Assistant Examiner—Richard K. Thomson
Attorney, Agent, or Firm—F. J. Fodale

[57] ABSTRACT

A tube feeder has a longitudinal support equipped with two rows of wheels which support various diameter tubes and a loader for delivering tubes one at a time to the wheels. The loader comprises transverse tracks mounted on the longitudinal support and cooperating lifter blades associated with an inclined storage rack. The height of the longitudinal support is adjustable to locate the centerlines of various diameter tubes on the same fixed centerline. As the height of the longitudinal support is adjusted for a particular diameter tube, the loader is automatically adjusted to handle tubes of the same diameter.

4 Claims, 5 Drawing Figures

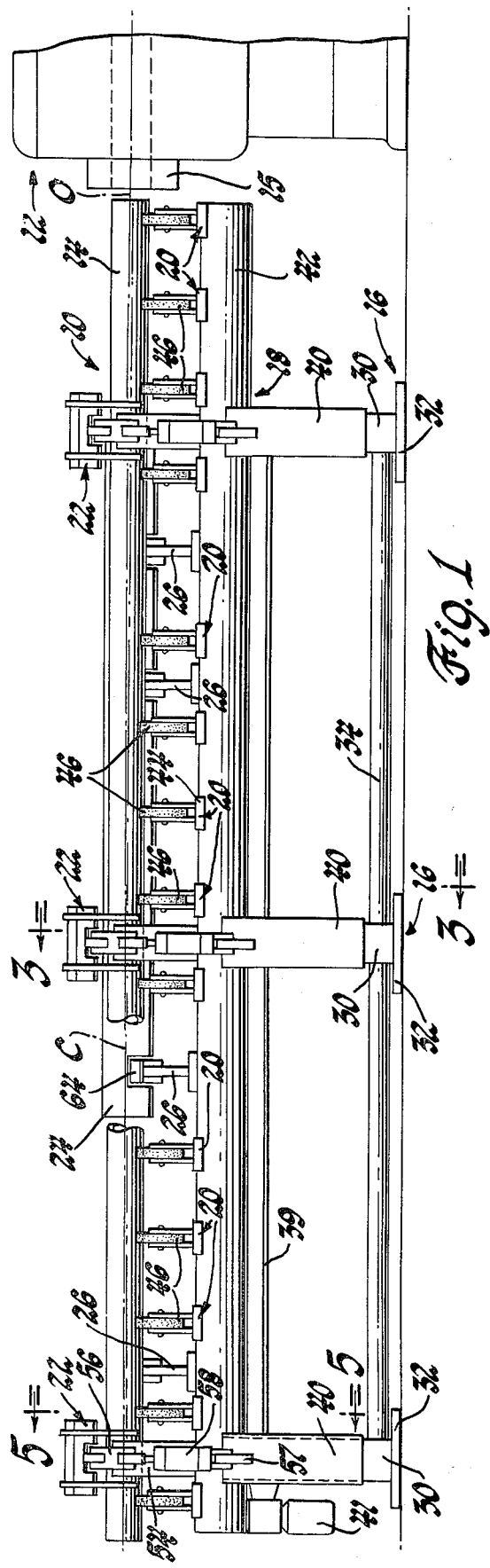

TUBE FEEDER WITH SELF-ADJUSTING LOADER

This invention relates generally to tube feeders for axially feeding a tube or the like to a turning machine and rotatably supporting the unmachined portions of the tube as the turning machine is machining the forward portions of the tube in a turning operation and more particularly to tube feeders which have the capability of handling tubes within a given range of diameters.

A tube feeder which handles tubes of different diameters must have some means to locate the centerline of the different diameter tubes it handles on a centerline coincident with the centerline of the headstock of the turning machine with which it is used. One way to properly locate the different diameter tubes is to employ a longitudinal support for the tube which moves up and down for differnt size tubes.

Many tube feeders also include devices for storing a number of tubes and loading the tube feeder with a new tube after machining of the first tube has been completed.

The object of my invention is to provide a tube feeder for handling various diameter tubes which has a self-adjusting loader.

Another object of my invention is to provide a tube feeder having a loader which self-adjusts to deliver a single tube from a storage rack when the height of the tube feeder is adjusted to locate a particular diameter tube which its centerline coincident with a predetermined centerline.

Yet another object of my invention is a tube feeder for handling various diameter tubes which when adjusted to rotatably support a tube of a particular diameter for rotation about a predetermined centerline automatically adjusts a loader associated therewith for delivery of tubes of the same diameter one at a time to the tube feeder.

The exact nature of this invention as well as other objects and advantages thereof will be readily apparent from consideration of the following specification relating to the annexed drawing in which:

FIG. 1 is a front view of a tube feeder incorporating a self-adjusting loader in accordance with my invention;

FIG. 2 is a top view of the tube feeder shown in FIG. 1;

Figure 3:
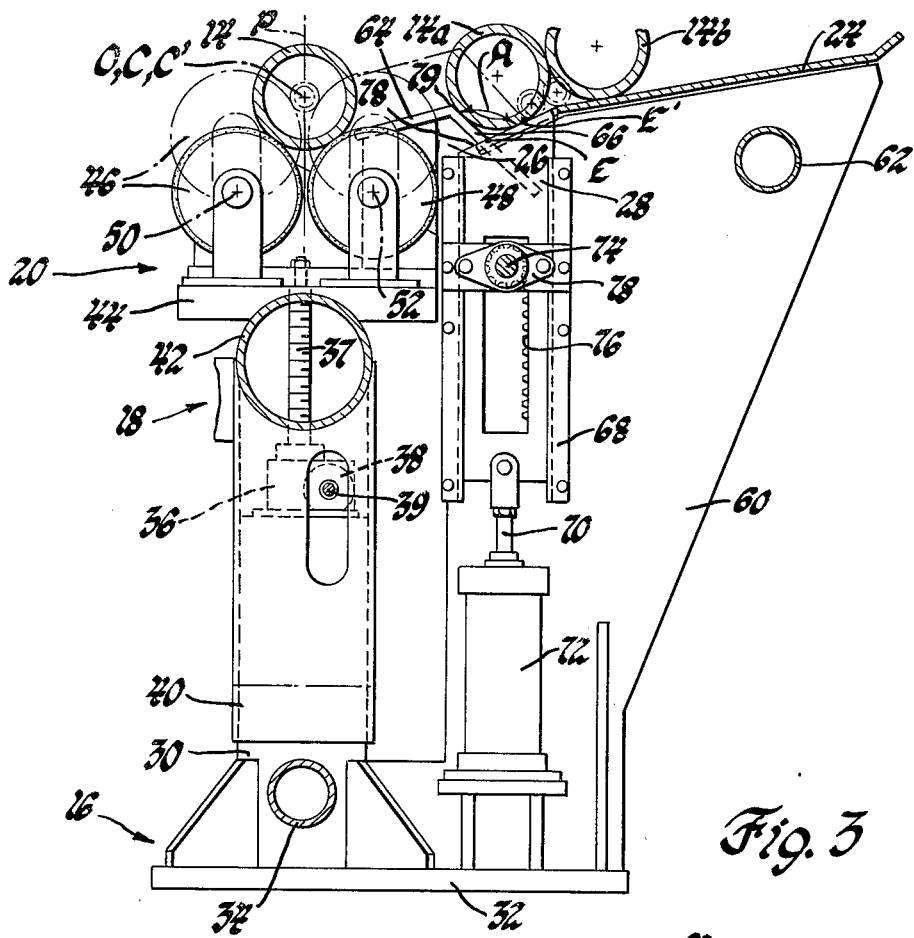
FIG. 3 is a section taken substantially along the line 3—3 of FIG. 1 showing various parts of the tube feeder and self-adjusting loader in a first operative position for handling large diameter tubes and in a second operative position for handling small diameter tubes.

Referring now to FIGS. 1 and 2 of the drawing, a tube feeder 10 is illustrated juxtaposed a turning machine, such as a lathe, represented schematically at 12. The function of the tube feeder 10 is to deliver a single tube 14 or the like, such as a cylindrical bar, from a storage rack to the position shown in FIGS. 1 and 2 wherein the tube 14 is rotatably supported for rotation about its centerline C which is located coincident with the centerline O of the headstock of the turning machine 12. The tube feeder 10 then indexes the tube 14 forwardly into a working position wherein a portion near the forward end of the tube 14 is clamped by a rotatable chuck 15 of the turning machine 12. The chuck 15 then rotates the tube 14 while the turning machine 12 shapes the forward end portion of the tube. The tube 14 is then indexed forwardly in stages by mechanism of either the feeder 10 or the turning machine 12 until the tube 14 is used up whereupon another tube is delivered to the position shown in FIGS. 1 and 2.

The feeder 10 comprises the following major components: a fixed base 16; a longitudinal support 18 mounted for vertical movement on the fixed base 16; centerless roller supporting means 20 mounted on the longitudinal support 18, hold-down rolls 22; friction drive rolls (not shown) for indexing the tube 14 forwardly; optional lifter rolls (not shown) for supporting the tube during the forward indexes; and a self-adjusting loader for delivering various diameter tubes, one at a time, to the centerless roller supporting means 20 comprising an inclined storage rack 24, a plurality of transverse tracks 26 and a plurality of lifter blades 28.

The fixed base 16 comprises three pedestals 30 which are secured to individual base plates 32 and connected by a tubular spacer 34. Each pedestal 30 supports a screw jack 36 (FIG. 3) having an extensible portion 37 connected to the longitudinal support 18.

The longitudinal support 18 comprises three vertical tubular columns 40 welded to a horizontal tubular frame 42. The columns 40 slide up and down on the pedestals 30 when the screw jacks 36 are actuated to raise or lower the longitudinal support. The screw jacks 36 are simultaneously actuated and synchronized by pinion gears 38 connected to a common shaft 39 driven by a gear box and a reversible electric motor 41 attached to the pedestal 30 at the left end of the machine as viewed in FIG. 1.

The centerless roller supporting means 20 comprises a plurality (fourteen as illustrated in FIGS. 1 and 2) of longitudinally spaced brackets 44 which are welded to the frame 42 and which each carry a pair of rotatable wheels 46 and 48. The wheels 46 and 48 are about 6 inches in diameter and preferably have resilient tires of polyurethane or the like for quiet operation. The wheels 46 and 48 of every pair are aligned longitudinally in two rows, with their respective axes coincident with two laterally spaced parallel centerlines 50 and 52. The wheels 46 and 48 rotatably support the tube 14 in a "centerless" manner. That is, the tube 14 is rotatably supported for rotation about its own centerline C which is located in the vertical plane P equidistant from the centerlines 50 and 52 at a height above the centerlines 50 and 52 which is determined by and varies with the diameter of the tube 14.

Figure 4:
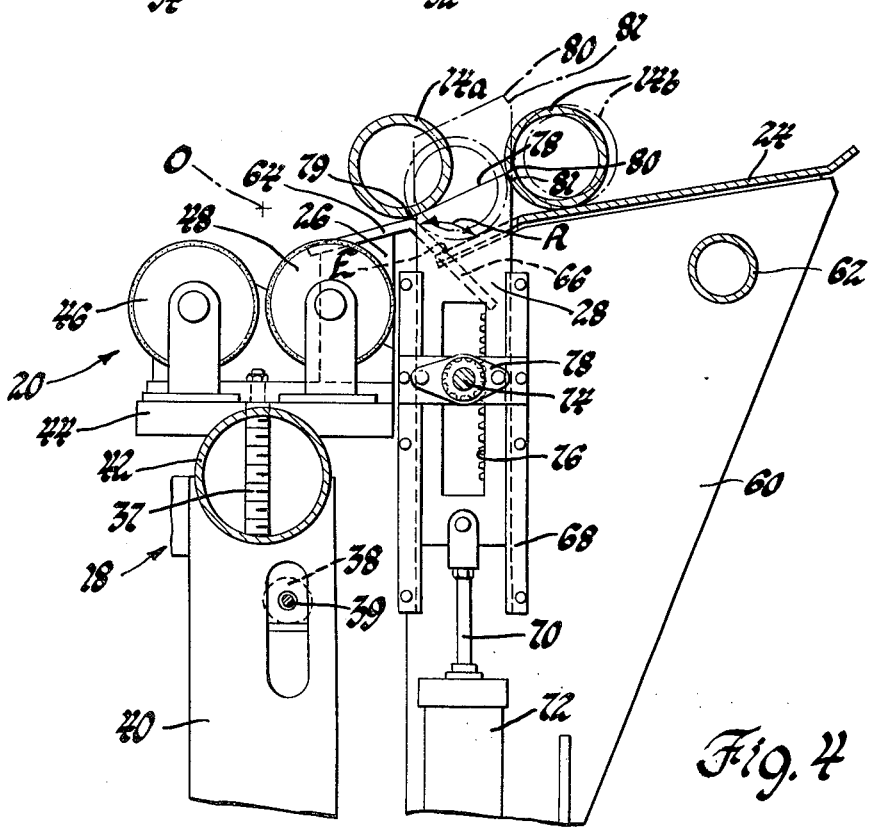
FIG. 4 is a view similar to FIG. 3 showing a part of the self-adjusting loader in various operative positions during the delivery of a large diameter tube.
Figure 5:
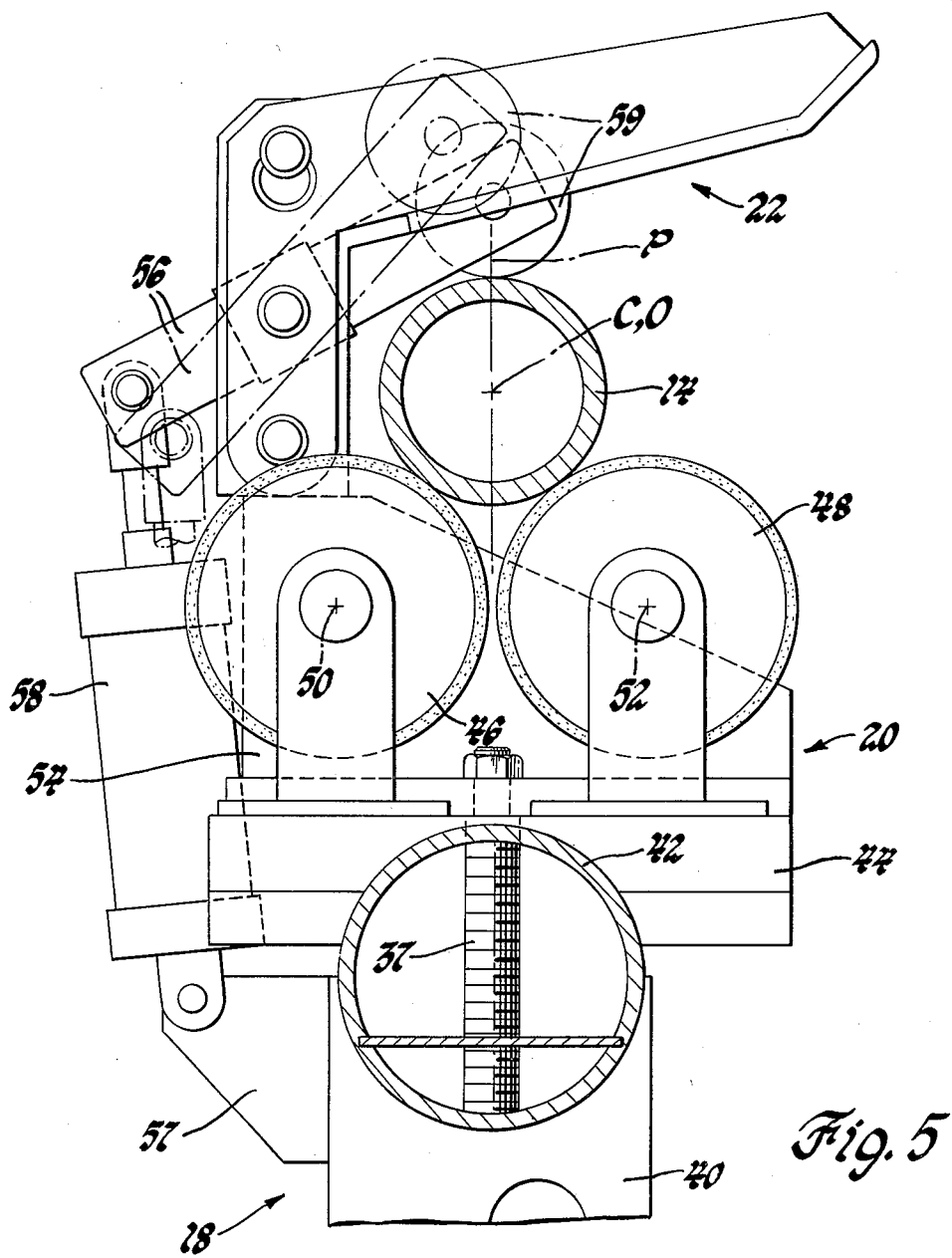
FIG. 5 is a section taken substantially along the line 5—5 of FIG. 1.

The three hold down rolls 22 shown in FIG. 1 have been omitted from FIGS. 2, 3 and 4 in the interest of clarity, however, a typical hold down roll 22 is shown in FIG. 5. The hold down roll 22 comprises a bracket 54 welded to the tubular frame 42 in line with one of the columns 40. A lever arm 56 is pivoted midway between its ends on the bracket 54 and one end is connected by a pivot pin to the piston stem of a fluid motor 58 whose cylinder is connected by a pivot pin to a bracket 57 welded to the column 40. The other end of the lever arm 56 rotatably carries a third wheel 59 which engages the upper surface of the tube 14 at the plane P to hold the tube 14 against the wheels 46 and 48 during high speed rotation. The fluid motor 58 raises and lowers the wheel 59 to adjust to various diameter tubes and also raises the wheel 59 out of engagement with the tube 14 when the tube 14 is being indexed forwardly either by friction drive rolls associated with the feeder 10 (not shown) or mechanism associated with the turning machine 12.

The feeder 10 may also include lifter rolls (not shown) which raise the tube 14 off the wheels 46 and 48 a small amount to reduce friction when the tube 14 is being indexed forwardly.

The Self-Adjusting Loader

The Self-Adjusting Loader as previously stated, comprises an inclined storage rack 24, a plurality of transverse tracks 26 and a plurality of lifter blades 28.

Referring now to FIGS. 3 and 4, each of the base plates 32 forming a part of the fixed support 16 has an attached vertical support plate 60. The support plates 60 are strengthened by a horizontal tubular brace 62 connecting their upper portions.

The inclined storage rack 24 is attached to the top of two of the support plates 60, that is, the middle and right hand plates 60 as shown in FIGS. 1 and 2. An inclined strip 24a may also be attached to the upper end of the left hand support plate 60 to accommodate relatively long tubes.

The transverse tracks 26, shown as four in number, in FIGS. 1 and 2, are attached to the frame 42 at various locations between the units of the centerless roller supporting means 20 and consequently move up and down with the longitudinal support 18 and with respect to the fixed base 16 and the inclined storage rack 24. The transverse tracks 26 are longitudinally aligned and each have a first ramp portion 64 inclined downwardly toward the wheels 46 and 48 and a second ramp portion 66 inclined downwardly in the opposite direction.

The tracks 26 are located so that the second ramp portions 66 provide a variably positioned stop for the inclined storage rack 24. Specifically, the ramp portions 66 of three of the tracks 26 are aligned with slots in the lower end of the inclined rack 24 to accommodate vertical movement of the tracks 26 with respect to the inclined rack 24. At any given position, the ramp portions 66 of the tracks 26 and the lower end of the rack 24 define a dihedral angle A having an edge E parallel to the centerlines 50 and 52 and the plane P in which the centerline C is located. As the tracks 26 move vertically, the dihedral angle A remains constant, however, the edge E shifts laterally.

The self-adjusting loader further includes lifter blades 28 associated with each of the vertical support plates 60. More specifically, the lifter blades 28 are slidably mounted in vertical tracks 68 attached to the support plates 60. The lower end of the middle blade is attached to a piston stem 70 of a fluid motor 72 which is mounted on the middle support plate 60.

Each of the blades 28 have an upper surface 78 inclined downwardly in the same direction as the ramp portions 64. As shown in FIGS. 3 and 4, the slope of the upper surface 78 is the same as the lower portion of the storage rack and lies coplanar with it when the blades 28 are in their retracted position. The high point 80 of the upper surface 78 moves in a fixed vertical plane which is parallel to and to the right of the edge E as the the lifter blades 28 are raised and lowered with respect to the storage rack 24 and the transverse tracks 26. The lifter blades 28 are moved in unison by pinion gears on a common shaft 74 which mesh with racks 76 on one side of vertical slots in the blades. The shaft 74 is journalled in pillow blocks 78 secured to each of the support plates 60. The blades are raised and lowered by the single fluid motor 72 via the middle blade and the rack and pinion gear arrangement.

Operation of the Self-Adjusting Loader

As previously mentioned, the height of the longitudinal support 18 is adjusted by means of the screw jacks 36 so that the tube 14 when supported on the rollers 46 and 48 has its centerline C coincident with the centerline O of the turning machine 12. This position of the longitudinal support 18 corresponds to the position of the wheels 46 and 48 and transverse track 26 shown in solid lines in FIGS. 3 and 4 from which it is to be noted that the transverse tracks 26 are positioned so that ramp portions 66 locate the stored tubes 14a and 14b so that most of the tube 14a abutting the ramp portion 66 of the track 26 while little, if any of the tube 14b, lies above the blade 28. When the tube 14 has been used up, the tube 14a is delivered to the wheels 46 and 48 by raising the blades 28 as shown in FIG. 4 which moves the tube 14a up the ramp portions 66 onto the ramp portions 64 whereupon the tube 14a rolls down onto the wheels 46 and 48. It should be noted that the ramp portions 64 which are fixed with respect to the wheels 48 are disposed substantially tangent to the wheels 48.

For smaller diameter tubes, 14′, 14′a and 14′b shown in phantom in FIG. 3, the longitudinal support 18 is raised by means of the screw jacks 36 so that the tube 14′ when supported on the wheels 46 and 48 has its centerline C′ coincident with the centerline O of the turning machine 12. When the longitudinal support 18 is raised to the position represented by the phantom line position of the wheels 46 and 48, the transverse tracks 26 are concurrently raised to the phantom line position, shifting the edge of the dihedral angle defined by the inclined rack 24 and the portions 66 of the transverse tracks 26 upwardly and toward the right to E′.

In this position, the ramp portions 66 still locate the smaller diameter stored tubes 14′a and 14′b so a major portion of the smaller diameter tube 14′a while little if any of the smaller diameter tube 14′b overlies blade 28 and consequently the loader is automatically adjusted so that only the tube 14′a is delivered to the wheels 46 and 48 when the blades 28 are lifted. An essential feature of the loader then is that the high points 80 of the blades 28 are located such that their line of action passes between the centerlines of the first and second tubes stored on the storage rack.

The self-adjusting loader is designed by selecting a dihedral angle and laying out the two end positions of the ramp portions 66 with respect to the rack 24 for the largest and smallest tubes to be accommodated such as is shown in solid and phantom lines respectively in FIG. 3. The blade 28 is then laid in with a high point 80 having a line of action which passes between the centerlines of the first and second stored tubes of the largest as well as the smallest diameter located on the storage rack in the positions determined by the position of the ramp portions 66. Since the tubes are supported on round surfaces of the wheels 46 and 48 and the dihedral angle A, only approximates the shape, the line of action of the high points 80 does not remain in the same relative position for the stored tubes of largest and smallest diameters. Consequently, it is preferable to place the high points 80 so that their line of action passes as nearly as possible to the midpoint between the centerlines of the largest diameter tube to minimize the movement of the second and remaining stored tubes of larger diameter back up the storage rack 24 as the blades 28 are raised to deliver the first stored tube to the wheels 46 and 48. If the dihedral angle selected in the initial layout does not give completely satisfactory results, the dihedral angle may be adjusted by changing the slope of the ramp portions 66 and/or the lower end of the storage rack 24 until a satisfactory high point location is found.

The width of the blade 26 is then chosen so that the inclined surface 78 intersects the peak 79 of the track 26 when the blade 28 is raised. As shown in FIG. 4, the inclined surface 78 of the blade 28 preferably has a slightly greater slope then the ramp portions 64 to facilitate moving the tubes past the peak 79 of the track, and the blade 28 may extend beyond the high point 80 a slight amount to provide a flat surface 81 for contacting the second stored tube 14b as the blade 26 is raised to deliver the first stored tube 14a. The fluid motor 72 may have a fixed stroke in which event the stroke should be great enough to raise the blade 26 to a position where it will lift the smallest tube to be accommodated onto the ramp portions 64.

In actual practice, a feeder machine having a self-adjusting loader which delivers tubes from 1¼ inches to 6 inches in diameter, and up to 20 feet in length one at a time to a centerless support comprising two rows of wheels which support the various diameter tubes for rotation about a fixed centerline at speeds up to 1000 feet per minute surface speed has been designed utilizing the above principles.

I wish it to be understood that I do not desire to be limited to the exact details of construction shown and described, for obvious modifications will occur to a person skilled in the art.

I claim:

1. A feeder having a self-adjusting loader for delivering various diameter tubes or the like, one at a time to a fixed centerline location, comprising in combination
   a fixed base and a longitudinal support mounted for vertical movement thereon,
   centerless roller supporting means mounted on said longitudinal support in a fixed relationship for rotatably supporting a tube or the like horizontally for rotation about its centerline which is disposed at a variable height with respect to said longitudinal support which is determined by the diameter of the tube or the like being supported,
   transverse track means secured to said longitudinal support and having a first portion inclined downwardly toward said centerless roller supporting means for gravity feeding tubes or the like to said centerless roller supporting means and a second portion inclined downwardly in the opposite direction,
   an inclined storage rack supported in fixed relationship to said fixed base and having a lower end portion positioned adjacent said second portion of said track means whereby said second portion provides a stop for tubes or the like when such are stored on said storage rack,
   lifter blade means longitudinally aligned with the second portion of said transverse track means and the lower end portion of said inclined storage rack and slidably mounted in vertical guides supported in fixed relationship to inclined storage rack,
   said lifter blade means having a high point and an upper surface portion inclined downwardly therefrom in the transverse direction toward said centerless supporting means,
   means for raising and lowering said lifter blade means with respect to said transverse track means and said inclined storage rack between a first position whereat said upper surface portion of said lifter blade means is coplanar with or below said lower end portion of said storage rack and a second position whereat said upper surface portion of said lifter blade means intersects an uppermost mid portion of said transverse track means between said first and second portions, and
   means for raising and lowering said longitudinal support with respect to said fixed base to adjust the height of said centerless roller supporting means to rotatably support a tube or the like of a given diameter with its centerline coincident with an imaginary horizontal centerline in fixed spatial relationship with respect to said fixed base and to concurrently adjust the height of said track means with respect to said inclined storage rack for locating a major portion of a tube or the like of said given diameter above that said upper surface portion of said lifter blade means when stored on said storage rack in abutment with said second portion of said transverse track means.

2. A feeder having a self-adjusting loader for delivering various diameter tubes or the like, one at a time to a fixed centerline location, comprising in combination
   a fixed base and a longitudinal support mounted for vertical movement thereon,
   centerless roller supporting means mounted on said longitudinal support in a fixed relationship for rotatably supporting a tube or the like horizontally for rotation about its centerline which is disposed at a variable height with respect to said longitudinal support which is determined by the diameter of the tube or the like being suported
   transverse track means secured to said longitudinal support and having a first portion inclined downwardly toward said centerless roller supporting means for gravity feeding tubes or the like to said centerless roller supporting means, a second portion inclined downwardly in the opposite direction, and an uppermost mid portion therebetween,
   an inclined storage rack supported in fixed relationship to said fixed base and having a lower end surface portion positioned toward said centerless roller supporting means,
   lifter blade means longitudinally aligned with the second portion of said track means and slidably mounted for vertical movement with respect to said second portion of said transverse track means, said lifter blade means having a high point and an upper surface portion inclined downwardly therefrom in the transverse direction toward said centerless support means, one of said surface portions and said second portion defining an imaginary dihedral angle having an edge parallel to said centerless roller supporting means,
   means for raising and lowering said lifter blade means with respect to said transverse track, means between a first position whereat said high point of said lifter blade means intersects said imaginary dihedral angle at a location spaced from said edge away from said centerless roller supporting means, and a second position whereat said upper surface portion of said lifter blade means intersects the uppermost mid portion of said track means, and means for raising and lowering said longitudinal support with respect to said fixed base to adjust the height of said centerless roller supporting means to rotatably support a tube or the like of a given diameter with its centerline coincident with an imaginary horizontal centerline in fixed spatial relationship with respect to said fixed base and to concurrently adjust the height of said transverse track means and thereby shift said edge laterally for locating a major portion of a tube or the like of said given diameter above said lifter blade means when said lifter blade means are in said first position and said last mentioned tube or the like is positioned by said one surface portion and said second portion of said transverse track means defining said imaginary dihedral angle.

3. A feeder having a self-adjusting loader for delivering various diameter tubes or the like, one at a time to a fixed centerline location, comprising in combination a fixed base and a longitudinal support mounted for vertical movement thereon, centerless roller supporting means mounted on said longitudinal support in a fixed relationship for rotatably supporting a tube or the like horizontally for rotation about its centerline which is disposed at a variable height with respect to said longitudinal support which is determined by the diameter of the tube or the like supported thereon, transverse track means secured to said longitudinal support and having a first portion inclined downwardly toward said centerless roller supporting means for gravity feeding tubes or the like to said centerless roller supporting means and a second portion inclined downwardly in the opposite direction, an inclined storage rack supported in fixed relationship to said fixed base said inclined storage rack having a lower end portion interdigitated with said second portion of said track means whereby said second portion provides a stop for tubes or the like when such are stored on said inclined storage rack lifter blade means longitudinally aligned with the second portion of said transverse track means and the lower end portion of said inclined storage rack and slidably mounted in vertical guides supported in fixed relationship to inclined storage rack, said lifter blade means having a high point and an upper surface portion inclined downwardly therefrom in the transverse direction toward said centerless supporting means, means for raising and lowering said lifter blade means with respect to said track means and said inclined storage rack between a retracted position whereat said upper surface portion of said lifter blade means is coplanar with or below said lower end portion of said inclined storage rack and an extended position whereat said upper surface portion of said lifter blade means intersects an uppermost mid portion of said track means, and means for raising and lowering said longitudinal support with respect to said fixed base between a first position whereat said centerless roller supporting means rotatably supports a tube or the like of a first given diameter with its centerline coincident with an imaginary centerline in fixed spatial relation with said fixed base, and said second portions of said transverse track means locates first and second tubes or the like of said first given diameter stored on said inclined rack such that the high point of the lifter blade means passes between the centerlines thereof as said lifter blade means moves from said retracted position to said extended position and a second position whereat said centerless roller supporting means rotatably supports a tube or the like of a second given diameter with its axis coincident with said imaginary centerline and said second portions of said track means locates first and second tubes of or the like of said second given diameter such that the high point of the lifter blade means passes between the centerlines thereof as said lifter blade means moves from said retracted position to said extended position.

4. A feeder having a self-adjusting loader for delivering various diameter tubes or the like, one at a time to a fixed centerline location, comprising in combination a fixed base and a longitudinal support mounted for vertical movement thereon, centerless roller supporting means mounted on said longitudinal support in a fixed relationship comprising a plurality of pairs of wheels arranged in two rows with the axes of each pair coincident respectively with two laterally spaced centerlines, for rotatably supporting a tube or the like horizontally for rotation about its centerline which is disposed at a variable height with respect to said longitudinal support which is determined by the diameter of the tube or the like supported on said pairs of wheels transverse track means secured to said longitudinal support and having a first portion located between the wheels in one of said rows inclined downwardly toward an imaginary vertical plane which passes between said laterally spaced centerline for gravity feeding tubes or the like to said pairs of wheels and a second portion inclined downwardly in the opposite direction, an inclined storage rack supported in fixed relationship to said fixed base and having a lower end portion positioned adjacent said second portion of said track means whereby said second portion provides a stop for tubes or the like when such are stored on said inclined storage rack lifter blade means longitudinally aligned with the second portion of said transverse track means and the lower end portion of said inclined storage rack and slidably mounted in vertical guides supported in fixed relationship to inclined storage rack, said lifter blade means having a high point and an upper surface portion inclined downwardly therefrom in the transverse direction toward said imaginary plane, means for raising and lowering said lifter blade means with respect to said track means and said inclined storage rack between a retracted position whereat said upper surface portion of said lifter blade means is coplanar with or below said lower end portion of said inclined storage rack and an extended position whereat said upper surface portion of said lifter blade means intersects an uppermost mid portion of said track means, means for raising and lowering said longitudinal support with respect to said fixed base between a first position whereat said centerless roller supporting means rotatably supports a tube or the like of a first given diameter with its centerline coincident with an imaginary centerline in fixed spatial relation with said fixed base said second portions of said transverse track means locates first and second tubes or the like of said first given diameter stored on said inclined rack such that the high point of the lifter blade means passes between the centerlines thereof as said lifter blade means moves from said retracted position to said extended position and a second position whereat said centerless roller supporting means rotatably supports a tube or the like of a second given diameter with its axis coincident with said imaginary centerline and said second portions of said track means locates first and second tubes of or the like of said second given diameter such that the high point of the lifter blade means passes between the centerlines thereof as said lifter blade means moves from said retracted position to said extended position, and hold down means comprising a plurality of third wheels mounted on said longitudinal support and movable generally vertically with respect thereto for engaging a tube or the like supported on said pairs of wheels above said imaginary centerline and means for raising and lowering said plurality of third wheels.

* * * * *